(12) United States Patent
Jan

(10) Patent No.: US 9,920,942 B2
(45) Date of Patent: Mar. 20, 2018

(54) HUMIDITY REGULATING SYSTEM

(71) Applicant: Altrason Inc., Taipei (TW)

(72) Inventor: Po-Sheng Jan, Taipei (TW)

(73) Assignee: ALTRASON INC., Taipei (TW)

( * ) Notice: Subject to any disclaimer, the term of this patent is extended or adjusted under 35 U.S.C. 154(b) by 456 days.

(21) Appl. No.: 14/831,211

(22) Filed: Aug. 20, 2015

(65) Prior Publication Data

US 2017/0010015 A1 Jan. 12, 2017

(30) Foreign Application Priority Data

Jul. 7, 2015 (TW) .............................. 104121946 A

(51) Int. Cl.
| | |
|---|---|
| F24D 19/10 | (2006.01) |
| F24F 11/00 | (2018.01) |
| G05D 23/275 | (2006.01) |
| F24F 3/14 | (2006.01) |
| F24F 6/02 | (2006.01) |
| G05D 22/02 | (2006.01) |
| G05D 22/00 | (2006.01) |
| F24F 6/00 | (2006.01) |

(52) U.S. Cl.
CPC ............ *F24F 11/0015* (2013.01); *F24F 3/14* (2013.01); *F24F 3/1411* (2013.01); *F24F 6/02* (2013.01); *F24F 11/0008* (2013.01); *F24F 3/1423* (2013.01); *F24F 2003/1435* (2013.01); *F24F 2003/1446* (2013.01); *F24F 2006/008* (2013.01); *F24F 2011/0067* (2013.01); *F24F 2011/0071* (2013.01); *F25B 2313/023* (2013.01); *F25B 2600/07* (2013.01); *G05D 22/00* (2013.01); *G05D 22/02* (2013.01)

(58) Field of Classification Search
CPC .. F25B 3/12; F25B 3/14; F25B 3/1411; F25B 3/1423; F25B 11/0008; F25B 2313/023; F25B 2600/07; G05D 22/00; G05D 22/02
USPC ......................................................... 236/1 B
See application file for complete search history.

(56) References Cited

U.S. PATENT DOCUMENTS

| | | | |
|---|---|---|---|
| 5,181,387 A | 6/1993 | Meckler | |
| 5,873,256 A | 2/1999 | Denniston | |
| 6,311,511 B1 | 11/2001 | Maeda | |
| 2014/0157806 A1 | 6/2014 | Ito et al. | |

(Continued)

OTHER PUBLICATIONS

Nov. 4, 2015, Notice of Allowance from US Patent and Trademark Office, in U.S. Appl. No. 14/309,522, which is another U.S. patent application of Applicant Altrason Inc.

*Primary Examiner* — Keith Raymond
*Assistant Examiner* — Daniel C Comings
(74) *Attorney, Agent, or Firm* — WPAT, PC

(57) ABSTRACT

A humidity regulating system comprises: a plurality of humidity adjusting devices to adsorb or vaporize the mist and water of the humidity adjusting rooms, a water regulating device to regulate the water supply to the humidity adjusting devices, a main controlling device to control the humidity regulating system, a communication connecting device to connect the plurality of humidity adjusting devices with the water regulating device and the main controlling device, and a remote controlling device which includes a remote controlling means to communicate with the main controlling device so as to regulate the plurality of humidity adjusting devices to adjust the humidity of the rooms.

11 Claims, 3 Drawing Sheets

(56) References Cited

U.S. PATENT DOCUMENTS

2014/0366567 A1* 12/2014 Vandermeulen ...... F24F 3/1417
62/271

* cited by examiner

HUMIDITY REGULATING SYSTEM

CROSS-REFERENCE TO RELATED APPLICATION

This application claims priority to Taiwanese Patent Application No. 104121946, filed Jul. 7, 2015, which is hereby incorporated by reference.

FIELD OF THE INVENTION

The present invention relates to an air conditioning system, and more particularly to a humidity regulating system.

BACKGROUND OF THE INVENTION

The higher the air temperature, the higher the saturated humidity. In medical science, there is a close relationship between air humidity and respiration. In an environment with relative humidity of 45 to 55%, oxygen can pass through the pulmonary alveoli and get into the blood relatively easy, thus when being in this kind of environment, the human body feel most comfortable. When being in an environment with high temperature and high humidity, the human body feels muggy since the perspiration function which regulates the body temperature is affected. In an environment with insufficient humidity, the human skin dries up easily and gets itchy; furthermore, the mucous membrane becomes stimulus-sensitive. In addition, air humidity control is very important for museums, libraries, manufacturing industry, building industry, alcohol-making industry, etc. In an environment with high humidity, moths, mold, termites, and microorganisms grow easily, and in an environment with insufficient humidity, the moisture content of objects excessively decreases, leading to damage such as stress variation, embrittlement, cracking, or warping.

Nevertheless, in prior art, the air-conditioning system, e.g., the central air-conditioning system, controls the air humidity degree by only providing either humidification or dehumidification, but not performs the humidification and dehumidification at the same time. Furthermore, the prior air-conditioning system is unable to be controlled via wired or wireless network. Some air conditioning systems even do not possess humidity monitoring mechanism, and is unable to turn off dehumidification function in time. Thus it is difficult for the air-conditioning system in prior art to satisfy different humidity requirements of different region, lack of practicality.

SUMMARY OF THE INVENTION

Therefore, one of the purposes of the present invention is to provide a humidity regulating system that can increase or decrease humidity, and can regulate humidity separately depending on different humidity adjusting rooms.

The technical means adopted by the present invention to overcome the drawbacks in prior art is to provide a humidity regulating system for regulating humidity, comprising:

a plurality of humidity adjusting devices, each including a corresponding control means which is used for controlling a humidity adjusting operation of the humidity adjusting device, in which the plurality of humidity adjusting devices are disposed in a plurality of humidity adjusting rooms;

a water regulating device, which is connected to the humidity adjusting devices through a water supplying pipe;

a main controlling device, including a network data transceiving means which receives a controlling signal from a network so as to enable the main controlling device to individually control the humidity adjusting operation of the corresponding control means in each of the humidity adjusting device of the plurality of humidity adjusting devices, and/or the network data transceiving means transmits a responding information via a network to respond with the humidity adjusting status of the plurality of humidity adjusting rooms; and a communication connecting device, which is for connecting the corresponding control means, and/or is for connecting the main controlling device and the corresponding control means, and/or is for connecting the water regulating device and the corresponding control means, wherein the main controlling device controls the corresponding control means and the water regulating device through the communication connecting device, and the water regulating device supplies the water needed for humidity adjustment to the humidity adjusting devices, and/or receives the water generated by the humidity adjusting devices.

In one embodiment of the present invention, the humidity regulating system further comprises a remote controlling device which includes a remote controlling means that performs a communicating operation with the network data transceiving means so as to send the control signal from the remote controlling device to the main controlling device, or to receive the responding information from the main controlling device and then forward the responding information to the remote controlling device.

In one embodiment of the present invention, a humidity regulating system is provided, wherein the water regulating device is a reverse osmosis filtering device which provides pure water needed for humidity adjustment of the humidity adjusting devices, and/or receives the water generated by the humidity adjusting devices.

In one embodiment of the present invention, a humidity regulating system is provided, wherein the humidity adjusting device includes a sensor which senses the temperature and humidity of the humidity adjusting room.

In one embodiment of the present invention, a humidity regulating system is provided, wherein the control signal sent by the remote controlling device controls the individual humidity setting value of the plurality of humidity adjusting rooms.

In one embodiment of the present invention, a humidity regulating system is provided, wherein the responding information received by the remote controlling device is the individual humidity information of each humidity adjusting room.

In one embodiment of the present invention, a humidity regulating system is provided, wherein the main controlling device further comprises a corresponding control and management means which controls the humidity setting value of the corresponding control means via the communication with the corresponding control means.

In one embodiment of the present invention, a humidity regulating system is provided, wherein the remote controlling means communicates with the network data transceiving means via wireless network communication.

In one embodiment of the present invention, a humidity regulating system is provided, wherein the water regulating device is disposed at a high point of the plurality of humidity adjusting rooms, in which the high point is with a height higher than a height point where each humidity adjusting device is placed.

In one embodiment of the present invention, a humidity regulating system is provided, wherein the communication connecting device is a controller area network bus cable.

In one embodiment of the present invention, a humidity regulating system is provided, wherein the humidity adjusting device includes a water tank which stores the water provided by the water regulating device, and a pipeline for drainage, in which the pipeline independently drains water, or the pipeline drains water with an air-conditioner pipeline.

By the technical means adopted by the present invention, the humidity regulating system of the present invention can regulate humidity using the humidity adjusting device, in which the humidity regulating system is equipped with humidity increasing function and humidity decreasing function. Therefore, there is no need to purchase a humidifier besides a dehumidifier, and thus the purchasing cost and storing space are saved.

Furthermore, the humidity regulating system of the present invention can also regulate humidity via wired or wireless network according to different humidity adjusting rooms. In specific, the humidity regulating system detects the humidity of the humidity adjusting rooms automatically via the humidity sensor, and then switches the humidity adjusting device to humidifying state or dehumidifying state according to the humidity requirement of different humidity adjusting rooms so as to maintain proper environmental humidity in each region at any time.

The present invention is further explained in the following description of the preferred embodiments and with reference to the appended drawings presented below.

DETAILED DESCRIPTION OF THE PREFERRED EMBODIMENTS

The implementation of the present invention is described as follows with reference to FIGS. 1 to 2. The descriptions herein are not to be construed as limitations on the present invention, but are to illustrate the embodiments of the present invention.

Figure 1:
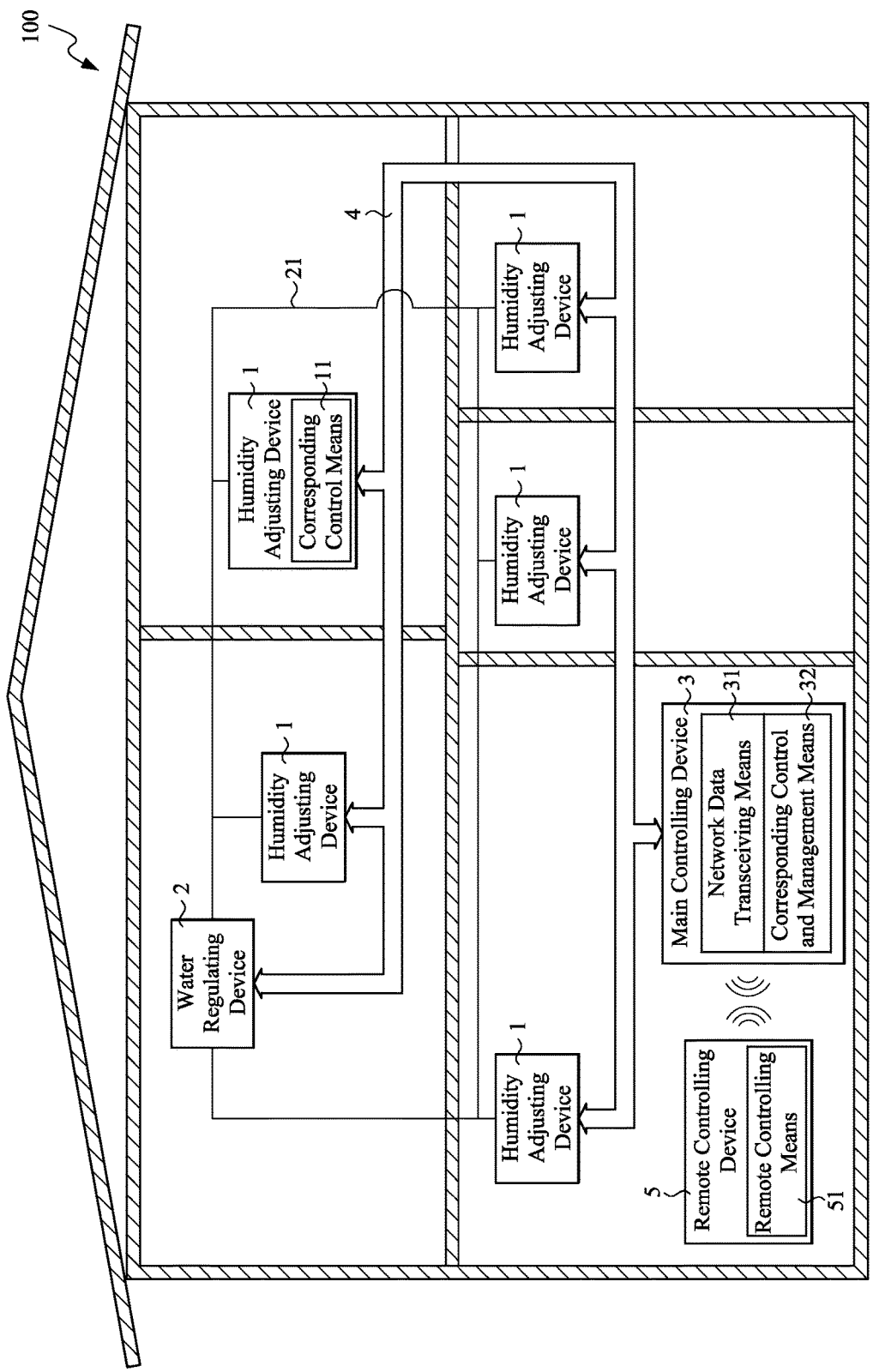
FIG. 1 is a schematic view illustrating a humidity regulating system according to an embodiment of the present invention being used.

Please refer to FIG. 1. In one embodiment, the present invention provides a humidity regulating system 100 which is disposed in a plurality of humidity adjusting rooms, and the humidity regulating system 100 comprises: a humidity adjusting device 1, a water regulating device 2, a main controlling device 3, a communication connecting device 4, and a remote controlling device 5.

Figure 2:
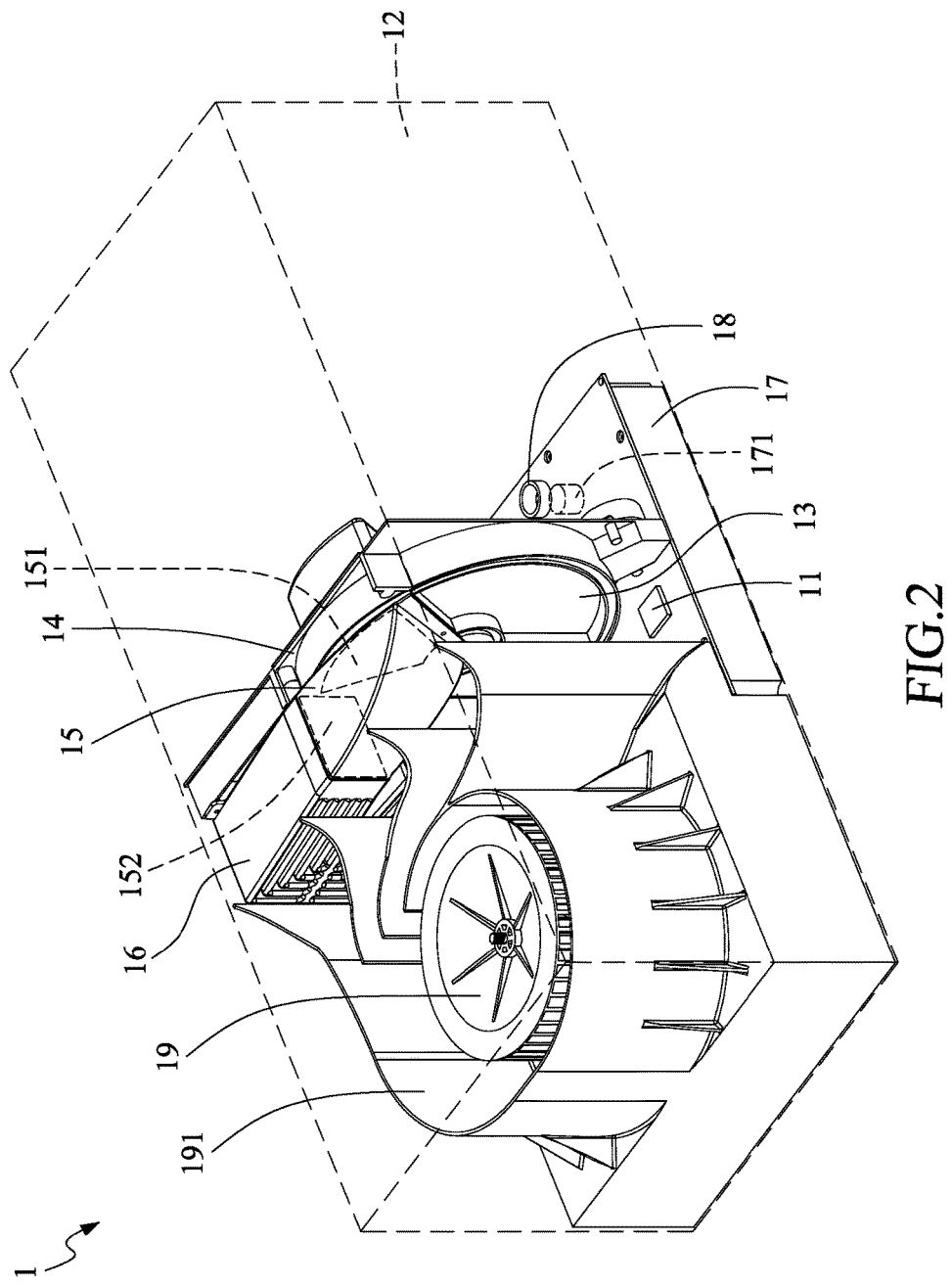
FIG. 2 is a three-dimensional view illustrating the humidity adjusting device in the humidity regulating system according to the embodiment of the present invention.

Please refer to FIG. 2. The humidity adjusting device 1 includes a corresponding control means 11 which is used for controlling a humidity adjusting operation of the humidity adjusting device 1, in which the plurality of humidity adjusting devices 1 are disposed in a plurality of humidity adjusting rooms. As shown in the FIG. 1, assuming there are five rooms in a house, each room disposed with the humidity adjusting devices 1, and then the plurality of humidity adjusting rooms are these rooms. The water regulating device 2 is disposed on the high point of the house, allowing the water regulating device 2 to connect to the humidity adjusting devices 1 via a water supplying pipeline 21. The main controlling device 3 which includes a network data transceiving means 31 is disposed in one of the rooms, and then, all the devices are connected by the communication connecting device 4, which is a network cable. The main controlling device 3 can adjust the humidity setting of the humidity adjusting devices 1 and the water supply setting of the water regulating device 2 through the communication connecting device 4. At the same time, the main controlling device 3 can communicate with a remote controlling device 5 wirelessly through the network data transceiving means 31 so as to send a control signal from the remote controlling device 5 to the main controlling device 3, or to receive a responding information from the main controlling device 3 and then forward the responding information to the remote controlling device 5. Preferably, the main controlling device 3 is a control panel device, and the remote controlling device 5 is a Smartphone or Tablet PC.

Please refer to FIG. 2. In the present embodiment, the humidity adjusting device 1 includes a corresponding control means 11, an casing 12, a moisture absorbing wheel 13, a heating blade 14, a guiding component 15, a water condensing component 16, a water tank 17, a plurality of vaporizers 18, and a main fan 19, wherein the corresponding control means 11 is the electricity supplying component of the humidity adjusting device 1. The moisture adsorbing wheel 13 rotates on its own axis in a self-rotating direction, adsorbing mist and water adjacent to the moisture absorbing wheel 13. The heating blade 14 is thermally connected with the moisture adsorbing wheel 13, moving relative to the moisture adsorbing wheel 13 to heat up the mist and water absorbed by the moisture absorbing wheel 13 and vaporize them into water vapor. The guiding component 15 includes a water vapor intake 151 and a dehumidifying outtake 152, in which the water vapor intake 151 is connected to the heating blade 14 to guide the water vapor in, and the water condensing component 16 is connected to the dehumidifying outtake 152 for condensing and collecting the guided-in water vapor so as to lower the humidity of the humidity adjusting room and to guide the condensed water in the water tank 17. The water tank 17 includes a secondary fan 171, and the plurality of vaporizers 18 are disposed in the water tank 17 to vaporize the water in the water tank 17 and guide the water vapor to the humidity adjusting room via a secondary fan 171 to increase the humidity of the humidity adjusting room. The main fan 19 is thermally connected with the moisture adsorbing wheel 13 and the water condensing component 16.

Figure 3:
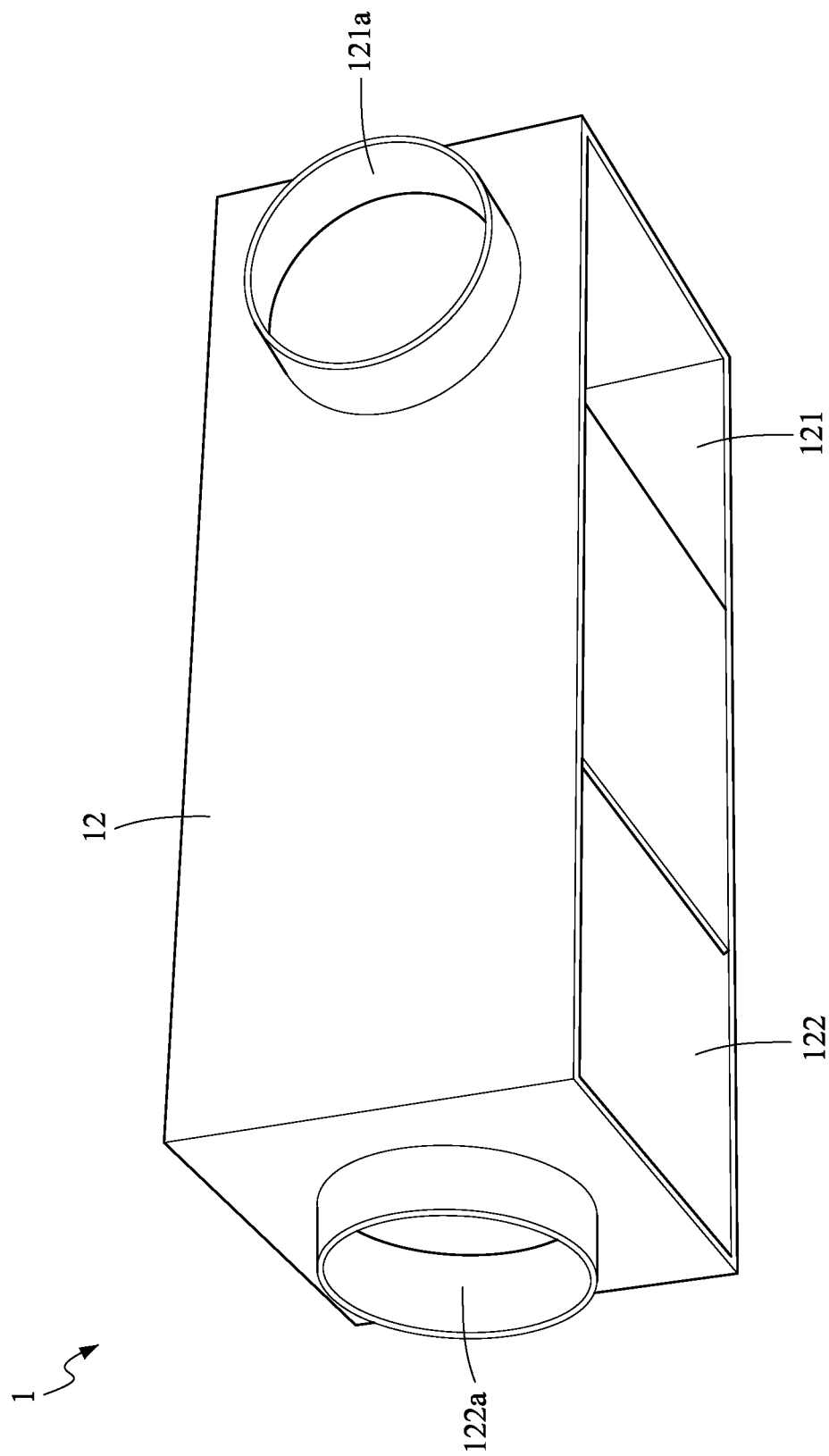
FIG. 3 is a schematic view illustrating the air intake and air outtake of the casing of the humidity adjusting device in the humidity regulating system according to the embodiment of the present invention.

Please refer to FIG. 3. The designs of the casing 12 of the humidity adjusting device 1 are divided into two types: the exposed design and the air duct design. The exposed design is disposed with an air intake 121 and an air outtake 122 separately on the bottom of the casing 12. The air duct design is disposed with an air intake 121a on one side of the casing 12, and an air outtake 122a on the front of the casing 12. The exposed design is suitable for general household environment which has lower requirements for interior design. The air duct design is suitable for hotels or large institutions, since these places demand that the humidity adjusting device 1 should be disposed in air ducts to prevent the setting of the humidity adjusting device from destroying the overall interior design.

In the present embodiment, preferably, to prevent the bacteria and dust from being vaporized into the air, the water regulating device 2 is a reverse osmosis filtering device which provides pure water needed for humidity adjustment of the humidity adjusting devices 1, and/or receives the water generated by the humidity adjusting devices 1. Certainly, the present invention is not limited to this. In other embodiments, the water regulating device 2 can be other kind of water purifying device. Besides, some of the reverse osmosis filtering devices can only supply water and do not take in water. Under these circumstances, the humidity adjusting device should be installed with a pipeline for drainage, in which the pipeline independently drains water, or the pipeline drains water with an air-conditioner pipeline.

In the present embodiment, the humidity adjusting device 1 includes a sensor which senses the temperature and humidity of the humidity adjusting room. The sensor is optionally disposed on an air intake surface 191 of the main fan 19 to detect the temperature and humidity of the humidity adjusting room precisely.

In the present embodiment, the control signal sent by the remote controlling device 5 controls the individual humidity setting value of the plurality of humidity adjusting rooms, and the responding information received by the remote controlling device 5 is the individual humidity information of each humidity adjusting room. Certainly, the present invention is not limited to this. In other embodiments, the control signal can also control the overall humidity setting value of the plurality of humidity adjusting rooms, and the responding information received by the remote controlling device 5 is the overall humidity information of the plurality of humidity adjusting rooms.

In the present embodiment, the main controlling device 3 further comprises a corresponding control and management means 32 which controls the humidity setting value of the corresponding control means 11 via the communication with the corresponding control means 11. Preferably, the corresponding control and management means 32 is composed mainly of ARM Cortex-A7 processor and ARM Cortex-M4 microprocessor, wherein the operating system is Android. The corresponding control means 11 utilizes APP programs developed on the Android system as the man-machine control interface. By the above mentioned means, the main controlling device 3 can adjust the humidity setting value of the plurality of humidity adjusting devices 1 and the water supply setting of the water regulating device 2 through the communication connecting device 4, and monitor all the devices and reported errors, and can update the firmware programs of all the devices using wireless network communication and APP programs.

In the present embodiment, the remote controlling means 51 communicates with the network data transceiving means 31 using the method of wireless network communication. In the present embodiment, the wireless network communication is WiFi network communication. Certainly, the present invention is not limited to this. In other embodiments, the network communication can be other kind of wireless network communication, for example, ZigBee and Bluetooth. In addition, the network data transceiving means 31 can be placed inside a USB dongle, which separates the wireless network communication function from the main controlling device 3. Thus, there is no need to apply for wireless network certificates in every country and the development speed of products can be elevated.

In the present embodiment, the water regulating device 2 is disposed at a high point of the plurality of humidity adjusting rooms. Preferably, the high point is with a height higher than a height point where each humidity adjusting device 1 is placed. Certainly, the present invention is not limited to this. In other embodiments, the water regulating device 2 do not have to be disposed at a high point, and the water can be pumped into the humidity adjusting rooms using a pumping device.

In the present embodiment, the communication connecting device 4 is a controller area network bus cable. The controller area network bus communications protocol is a kind of serial double-wired differential transmission, and the controller area network bus communications protocol is characterized in that it allows direct communication between the microprocessor and the device without any host on the network to control the communication.

In the present embodiment, the humidity adjusting device 1 includes a water tank 17 which stores the water provided by the water regulating device 2, and a pipeline for drainage, in which the pipeline independently drains water, or the pipeline drains water with an air-conditioner pipeline. The plurality of vaporizers 18 in the water tank 17 are ultrasonic atomizers. Preferably, the water tank 17 includes a ultraviolet germicidal lamp which is used for sterilizing the stored water thoroughly so as to prevent the bacteria and dust from being vaporized into the air.

In other embodiments, the humidifying function of the humidity adjusting device 1 can be removed. For example, remove the plurality of vaporizers 18 and the secondary fan 171, take out the water regulating device 2 and finally set up a pipeline for drainage, in which the pipeline independently drains water, or the pipeline drains water with an air-conditioner pipeline. Afterwards, the humidity adjusting device 1 becomes a pure dehumidifying device which is much more suitable for environment with high temperature and high humidity in Taiwan.

The above description should be considered as only the discussion of the preferred embodiments of the present invention. However, a person with ordinary skill in the art may make various modifications to the present invention. Those modifications should still fall within the spirit and scope defined by the appended claims.

What is claimed is:

1. A humidity regulating system for regulating humidity, comprising:
    a plurality of humidity adjusting devices, each including a corresponding control means which is used for controlling a humidity adjusting operation of the humidity adjusting device, in which the plurality of humidity adjusting devices are disposed in a plurality of humidity adjusting rooms;
    a water regulating device, which is connected to the humidity adjusting devices through a water supplying pipe;
    a main controlling device, including a network data transceiving means which receives a controlling signal from a network so as to enable the main controlling device to individually control the humidity adjusting operation of the corresponding control means in each of the humidity adjusting device of the plurality of humidity adjusting devices, and/or the network data transceiving means transmits a responding information via a network to respond with the humidity adjusting status of the plurality of humidity adjusting rooms; and
    a communication connecting device, which is for connecting the corresponding control means, and/or is for connecting the main controlling device and the corresponding control means, and/or is for connecting the water regulating device and the corresponding control means, wherein the main controlling device controls the corresponding control means and the water regulating device through the communication connecting device, and the water regulating device supplies the water needed for humidity adjustment to the humidity adjusting devices, and/or receives the water generated by the humidity adjusting devices.

2. The humidity regulating system as claimed in claim 1, further comprising a remote controlling device which includes a remote controlling means that performs a communicating operation with the network data transceiving means so as to send the control signal from the remote controlling device to the main controlling device, or to receive the responding information from the main controlling device and then forward the responding information to the remote controlling device.

3. The humidity regulating system as claimed in claim 1, wherein the water regulating device is a reverse osmosis filtering device which provides pure water needed for humidity adjustment of the humidity adjusting devices, and/or receives the water generated by the humidity adjusting devices.

4. The humidity regulating system as claimed in claim 1, wherein the humidity adjusting device includes a sensor which senses the temperature and humidity of the humidity adjusting room.

5. The humidity regulating system as claimed in claim 1, wherein the control signal sent by the remote controlling device controls the individual humidity setting value of the plurality of humidity adjusting rooms.

6. The humidity regulating system as claimed in claim 1, wherein the responding information received by the remote controlling device is the individual humidity information of each humidity adjusting room.

7. The humidity regulating system as claimed in claim 1, wherein the main controlling device further comprises a corresponding control and management means which controls the humidity setting value of the corresponding control means via the communication with the corresponding control means.

8. The humidity regulating system as claimed in claim 1, wherein the remote controlling means communicates with the network data transceiving means via wireless network communication.

9. The humidity regulating system as claimed in claim 1, wherein the water regulating device is disposed at a high point of the plurality of humidity adjusting rooms, in which the high point is with a height higher than a height point where each humidity adjusting device is placed.

10. The humidity regulating system as claimed in claim 1, wherein the communication connecting device is a controller area network bus cable.

11. The humidity regulating system as claimed in claim 1, wherein the humidity adjusting device includes a water tank which stores the water provided by the water regulating device, and a pipeline for drainage, in which the pipeline independently drains water, or the pipeline drains water with an air-conditioner pipeline.

* * * * *